(12) United States Patent
Jaccard et al.

(10) Patent No.: US 9,149,148 B2
(45) Date of Patent: Oct. 6, 2015

(54) MULTI-SYSTEM BEVERAGE MACHINE (71) Applicant: NESTEC S.A., Vevey (CH)

(72) Inventors: Alain Jaccard, Sainte-Croix (CH);
Youcef Ait Bouziad, Echandens (CH);
Renzo Moser, Gummenen (CH)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 14/369,878

(22) PCT Filed: Dec. 20, 2012

(86) PCT No.: PCT/EP2012/076270
§ 371 (c)(1),
(2) Date: Jun. 30, 2014

(87) PCT Pub. No.: WO2013/098173
PCT Pub. Date: Jul. 4, 2013

(65) Prior Publication Data
US 2014/0338541 A1    Nov. 20, 2014

(30) Foreign Application Priority Data

Dec. 30, 2011  (EP) ..................................... 11196154

(51) Int. Cl.
*A47J 31/36* (2006.01)
*A47J 31/00* (2006.01)
*A47J 31/46* (2006.01)

(52) U.S. Cl.
CPC *A47J 31/36* (2013.01); *A47J 31/00* (2013.01); *A47J 31/46* (2013.01)

(58) Field of Classification Search
CPC ............ A47J 31/00; A47J 31/46; A47J 31/36
See application file for complete search history.

(56) References Cited

U.S. PATENT DOCUMENTS

| 7,325,479 B2 * | 2/2008 | Laigneau et al. ............... 99/295 |
| 2003/0145736 A1 | 8/2003 | Green |
| 2005/0183578 A1 * | 8/2005 | Mandralis et al. ............. 99/279 |
| 2010/0132564 A1 * | 6/2010 | Ozanne et al. .................. 99/275 |
| 2010/0162897 A1 * | 7/2010 | Ozanne et al. .................. 99/280 |
| 2011/0041696 A1 * | 2/2011 | Aemisegger et al. ........... 99/281 |
| 2014/0352544 A1 * | 12/2014 | Yoakim et al. .................. 99/295 |

FOREIGN PATENT DOCUMENTS

EP    1864598    12/2007

OTHER PUBLICATIONS

International Search Report, mailed Mar. 1, 2013 in PCT/EP2012/076270, filed Dec. 20, 2012.
Written Opinion of the International Search Report, mailed Mar. 1, 2013 in PCT/EP2012/076270, filed Dec. 20, 2012.

* cited by examiner

*Primary Examiner* — Dana Ross
*Assistant Examiner* — John J Norton
(74) *Attorney, Agent, or Firm* — Dunlap Codding, P.C.

(57) ABSTRACT

A beverage preparation machine is disclosed that includes a base and at least one module. The base conditions and delivers a fluid to the at least one module that houses an ingredient to be mixed with the fluid. The base is controlled by a control unit that is configured to control the flow and the pressure of the liquid delivered to the module, during the preparation of a beverage, according to a command selected from a plurality of commands suitable for different types of ingredients and/or for different preparation processes of a given ingredient.

17 Claims, 6 Drawing Sheets

MULTI-SYSTEM BEVERAGE MACHINE

CROSS REFERENCE TO RELATED APPLICATIONS/INCORPORATION BY REFERENCE STATEMENT

This application is a 35 USC §371 national stage application of PCT Application No. PCT/EP2012/076270, filed Dec. 20, 2012; which claims priority to EP Application No. 11196154.6, filed Dec. 30, 2011. The entirety of each of the above-referenced applications is hereby expressly incorporated herein by reference.

FIELD OF THE INVENTION

The field of the invention pertains to beverage preparation machines, in particular using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of tea and coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Typically, beverage preparation machines have a body arranged to circulate a fluid to a connection arrangement having a capsule piercer for connecting a removable support or holder of an ingredient capsule and pierce such capsule during the connection. Liquid is circulated via the connection arrangement into the pierced capsule to form the beverage by mixing the liquid with the ingredient in the capsule. Examples of such beverage machines are disclosed in WO2005/016093 and EP 1 868 473. These two references also disclose the use of different removable supports or holder for use with the same machine body for preparing different kind of beverages.

Typically, fluid systems of beverage preparation machines embed a piston pump. These fluid systems are designed and optimized for delivering a fixed flow of liquid into the capsule under a given pressure. The couple flow/pressure is specifically chosen to fit the type of beverages the machine is arranged to prepare. By design, the characteristics and the performances of the piston pump are well-known and adapted only to this restricted domain: for instance, for preparing beverages with a high flow of liquid injected at a low-pressure.

Typically, a fluid system of a conventional low-pressure machine, for example a coffee machine, is arranged to deliver between 350 and 600 ml/min of water under a pressure comprised between 0 and 5 bars. A fluid system of a high-pressure espresso coffee machine is arranged to deliver between 150 and 300 ml/min of water under a pressure comprised between 15 and 25 bars.

Figure 1:
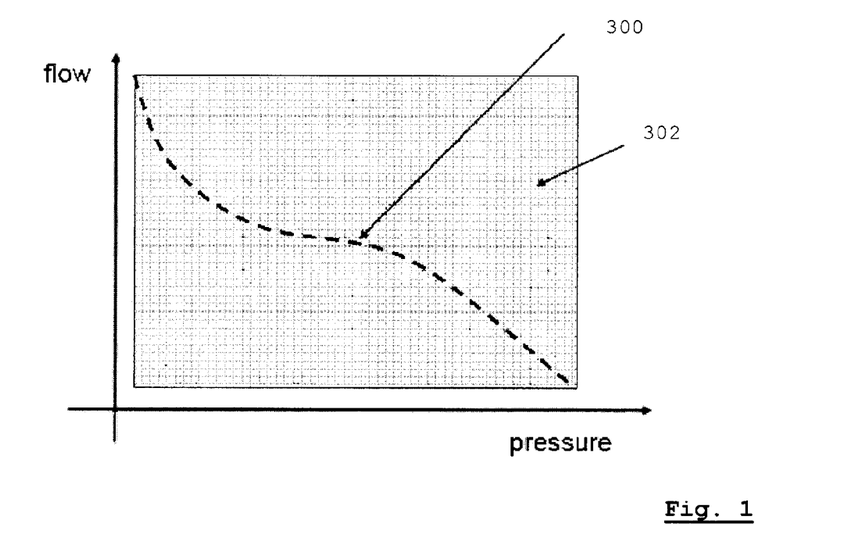
FIG. 1 shows a schematic diagram representing the flow/pressure possibilities (curve 300) of a legacy fluid system compared to those (area 302) of the fluid system according to the invention.

FIG. 1 shows schematically on a graph a typical curve 300 representing the flow/pressure domain covered by a piston pump in a beverage machine, X-axis representing the pressure of the liquid, Y-axis the flow of the liquid. It appears clearly that the curve 300 is non-linear and that very limited couples of pressure/flow are actually achievable.

As a consequence, while a piston pump performs reasonably well in traditional mono-system beverage machines, i.e. machines adapted to prepare beverages with similar flow/pressure requirements, it is not adapted to multi-system beverage machines adapted to prepare different beverages with different flow/pressure requirements.

SUMMARY OF THE INVENTION

The invention relates to a machine for preparing a beverage from at least one ingredient and dispensing such prepared beverage. For instance, the machine is a coffee, tea, chocolate, cacao, milk and/or soup preparation machine. In particular, the machine is arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage.

Formed and dispensed coffee beverages may be selected from ristrettos, espressos, lungos, cappuccinos, café latte, americano coffees, teas, etc. . . . For example, a coffee machine may be configured for dispensing espressos, e.g. an adjustable volume of 20 to 60 ml per serving, and/or for dispensing lungos, e.g. a volume in the range of 70 to 150 ml per serving.

Tea may be dispensed in larger amounts than coffee, e.g. typically between 100 and 300 ml per serving. Chocolate and other beverages, e.g. soup, can be dispensed in the same amount.

When (accumulation) pots are filled for subsequently filling several cups or mugs, the serving may be in the range of 500 to 2000 ml.

In particular, the beverage preparation machine comprises:
 a base having a fluid circuit for conditioning and delivering a fluid via a base outlet, said fluid circuit being coupled to a fluid source and controlled by a control unit and comprising a pump; and,
 at least one module having a module inlet cooperating with the base outlet, said module having a unit for housing an ingredient to be mixed with such fluid.

The pump is a membrane pump. Typically, the membrane pump is adapted to deliver up to 600 ml/min of the fluid to the module. The membrane pump is typically adapted to deliver the fluid to the module with a pressure up to 25 bars.

The control unit is configured to control the flow and the pressure of the liquid delivered by the membrane pump to the module, during the preparation of a beverage, according to a command selected from a plurality of commands suitable for different types of ingredients and/or for different preparation processes of a given ingredient.

In particular, each command comprises information describing a process or a method to prepare a type of beverage. For example, a command may contain information describing the variations, over the time, of the pressure and/or the flow of the liquid to deliver to a capsule. A command may also comprise additional information, for example the quantity and/or the type of ingredients to mix. A command may be specific to an ingredient, for example for a variety of coffee or tea, or for infant formula. A command may also be specific to a type of preparation or a recipe for an ingredient or a combination of ingredients, for example ristrettos, espressos, lungos, cappuccinos, lungo or ristreto.

Since it comprises a membrane pump, the machine may be configured to use a broad variety of different commands, having very different flow/pressure requirements. Hence, the machine can prepare a large number of different beverage, using a common fluidic system and a single membrane pump. This solution is flexible and cost-effective, and allows fine-tuning the preparation process to enhance in-cup quality of the beverage. Moreover, the membrane pump gives more flexibility in terms of integration into the machine, in particular thanks to the possibilities to place the inlet and the outlet of the pump with greater flexibility (for example on a single side of the pump), and thanks to the reduced length of the chamber of the pump compared to a piston pump.

Typically, such unit is arranged to house a capsule of a flavouring ingredient, e.g. tea, coffee, chocolate, milk, soup, etc. or such flavouring ingredient in loose form. For example, the unit is of the type disclosed in WO 2005/004683, WO 2007/135135, WO 2007/135136, WO 2008/148601, WO 2007/042415, WO 2011/069830 or WO 2011/076750. Suitable examples of capsules and capsule handling mechanisms inside a beverage machine are disclosed in EP 1 859 714, EP 2 103 236, EP 2 205 133, and in the references cited therein. The unit may be a milk frothing arrangement, e.g. with a venturi system, for instance as disclosed in WO 01/26520.

In an embodiment, the control unit is configured to control, according to at least one of the plurality of commands, the membrane pump to deliver between 100 and 300 ml/min of the liquid to the module with a pressure comprised between 12 and 25 bars, during at least one period of the preparation of the beverage. This is for example adapted to prepare high-pressure low flow beverage, for example espressos and cappuccinos. The control unit may also be configured to control, according to at least one of the plurality of commands, the membrane pump to deliver between 300 and 600 ml/min of the liquid to the module with a pressure comprised between 0 and 3 bars, during at least one period the preparation of the beverage. This is for example adapted to prepare low-pressure high-flow beverage, for example tea, filter coffee or chocolates.

In an embodiment, one of the plurality of commands is used selectively by the control unit, depending on a user input. For example, the user having selected by pressing a button to prepare a given volume of beverage, for instance a lungo coffee, the suitable command is selected and then applied by the control unit for preparing the beverage. One of the plurality of commands may be used selectively by the control unit, depending on the type of the ingredient housed by the module. The ingredient contained into the module may be detected using ingredient sensing means, code reading arrangements, or according to the module used to prepare the beverage. One of the plurality of commands may be used selectively by the control unit, depending on the type of the ingredient housed by the module and a user input.

In an embodiment, the base has a base data interface. The module is a removable module having a module data interface detachably connectable to the base outlet and the base data interface, respectively. The removable module may be arranged to communicate module identification data to the control unit via the base data interface for identification by the base of a type of the module connected to the base from a plurality of different types of modules, such as different types of modules for processing coffee, tea, milk, chocolate and soup, one of the plurality of commands being used selectively by the control unit according to the identification data of the removable module used to prepare the beverage. The removable module may be arranged to communicate ingredient identification data to the base via the base data interface for identification by the base of a type of ingredient contained in the module connected to the base from a plurality of different types of ingredients suitable to be processed by the removable module, one of the plurality of commands being used selectively by the control unit according to the ingredient identification data of the removable module used to prepare the beverage.

The module is typically removable from the base by a user. It is thus non-permanently connected to the base. In other words, it can be removed and replaced or substituted with another module by a user, e.g. a regular consumer, as a normal operation, i.e. without requiring any special professional skills or tooling as would for instance require a specially trained service or repair person. The module is neither welded nor glued to the base and not assembled thereto by any permanent mechanical assembly the disassembly of which requires a destructive operation, e.g. rivets, or a disassembly step which is non-obvious for a user that is not specially trained.

Hence, the module is arranged to be removable by a user for normal handling of the machine, in particular without special tooling or expert knowledge e.g. as used by servicemen. A reason for such a removal may be servicing or repair of the module and/or the base. Another reason for such a removal may be a substitution of a module of one type by a module of another type, typically for preparing with the same machine base and different types of modules compatible with the base different types of beverages and/or beverages from ingredients supplied to the modules in different types of shapes e.g. within capsules or pods or as loose ingredients, the different types of modules being all compatible for connection and operation with the same base. If follows that the machine with such a base and module(s) provides a great versatility of use of the module(s).

In an embodiment, the beverage preparation machine further comprises a plurality of seats for connecting simultaneously a corresponding plurality of modules, in particular by a corresponding plurality of base outlets, module inlets, base interfaces and module interfaces, optionally such a seat may be connected to a module that is not connected to the base outlet such as a user-interface module that is connected to the base via the base and module data interfaces.

The module data interface may be arranged to communicate module identification data to the base via the base data interface for identification by the base of a type of the module connected to the base from a plurality of different types of modules, such as different types of modules for processing coffee, tea, milk, chocolate and soup.

The module data interface can be arranged to communicate ingredient identification data to the base via the base data interface for identification by the base of a type of ingredient contained in the module connected to the base from a plurality of different types of ingredients suitable to be processed by the module.

For example, the module and the base data interfaces comprise cooperating module and base connectors for transmitting data in magnetic and/or mechanical form, in particular for transmitting module identification data.

In a particular embodiment, the machine comprises a plurality of seats for connecting simultaneously a corresponding plurality of modules, in particular by a corresponding plurality of base outlets, module inlets, base interfaces and module interfaces. Optionally, such a seat is connected to a module that is not connected to the base outlet e.g. a user-interface module that is connected to the base via the base and module data interfaces.

Such a base with a plurality of seats may share the same fluid circuit, or part of a fluid circuit e.g. fluid source, pump and/or thermal conditioner, between the different modules connected to the different seats, or the base may have a separate fluid circuits for each seat and connected module. Even in the latter configuration, a single control unit may be used to control all the fluid circuit(s).

Hence, the same base may be used to combine different beverage preparation systems simultaneously. Moreover, a base may be used with exchangeable different user-interfaces. For instance, the different user-interfaces may be more or less sophisticated or flexible, and/or the may be differently personalized user-interfaces.

BRIEF DESCRIPTION OF THE DRAWINGS

The invention will now be described with reference to the schematic drawings, wherein.

DETAILED DESCRIPTION

Figure 2A:
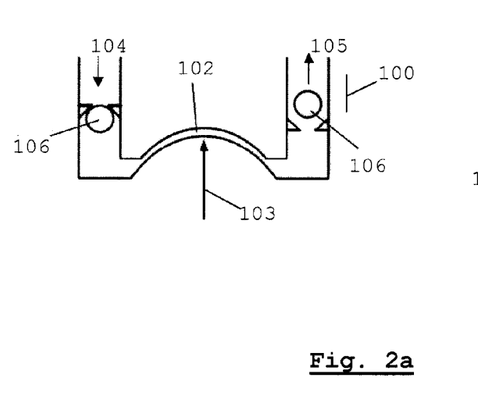
FIGS. 2a, 2b show schematic overviews of an embodiment of a pump according to the invention.
Figure 2B:
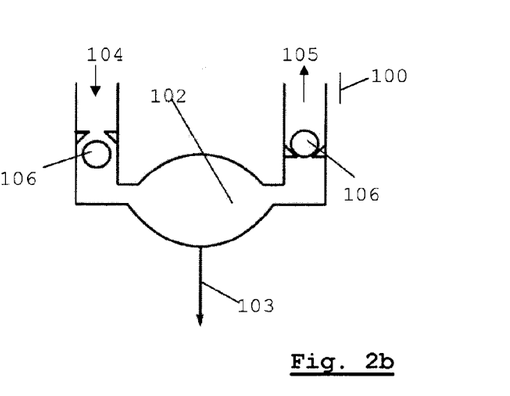
Figure 3:
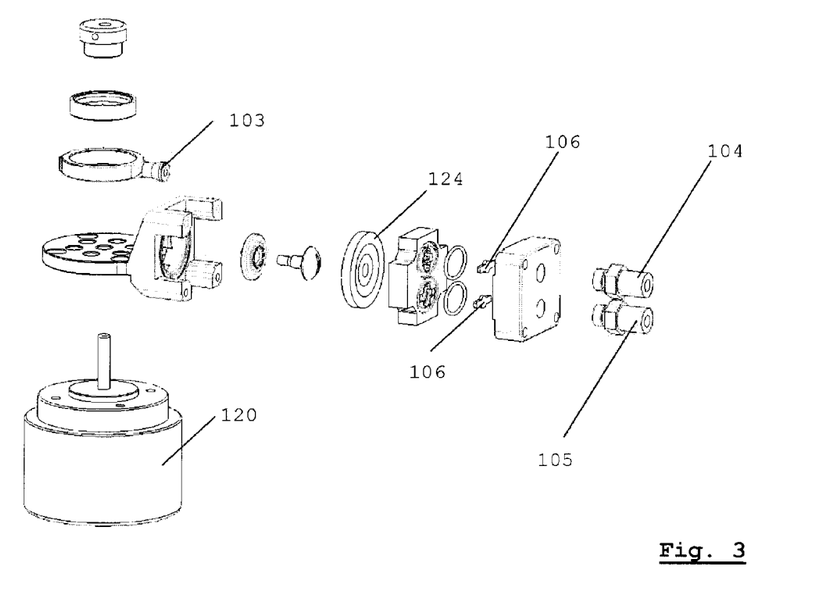
FIG. 3 shows individual parts included in an embodiment of a pump according to the invention.

Referring now to FIGS. 2a, 2b, and 3, a pump 100 according to an embodiment is described hereafter. The pump 100 is a membrane pump, also designated by the terms diaphragm pump, adapted to be used in a beverage preparation machines. The membrane pump is a positive displacement pump comprising a chamber 102 formed by at least one diaphragm 124. The diaphragm is deformable under the action of an actuator 103 coupled to a motor 120. As a consequence the volume of the chamber can be modified, i.e. increased or decreased, according to interactions of the actuator with the membrane, when said actuator is driven by the action of the motor 120.

The diaphragm is flexible, allowing the volume of the pump chamber to increase or decrease depending of the position of the diaphragm. A pair of non-return check valves 106 prevents reverse flow of the fluid.

Figure 4A:
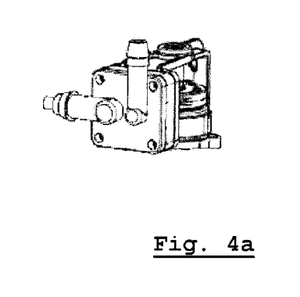
FIGS. 4a, 4b, 4c shows several configuration of the inlet and the outlet of an embodiment of a pump according to the invention.
Figure 4B:
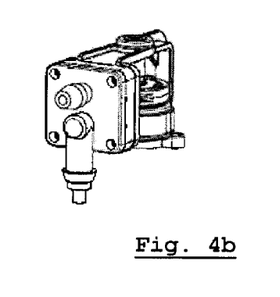
Figure 4C:
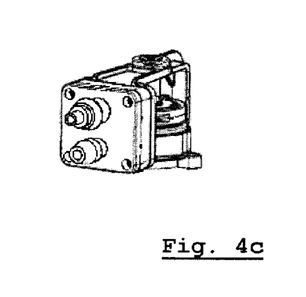

The diaphragm can be made of rubber, thermoplastic or Teflon. The chamber is fluidically connected to an inlet 104 and an outlet 105. The inlet and the outlet comprise each a non-return check valve 106. The inlet of the pump is in fluid connection with a liquid supply. The liquid supply is preferably connected to the liquid inlet by means of a hose or tubular member. The liquid supply may be a liquid reservoir which is preferably connected to the device in a detachable manner. Moreover, the liquid supply may be a connection to a water tap. Different configurations of the inlet and the outlet of the pump is represented on FIGS. 4a, 4b, 4c.

When the volume of a chamber of the pump is increased (the diaphragm moving up), the pressure decreases, and fluid is drawn into the chamber. When the chamber pressure later increases from decreased volume (the diaphragm moving down), the fluid previously drawn in is forced out. Finally, the diaphragm moving up once again draws fluid into the chamber, completing the cycle.

FIGS. 5 to 11, in which the same references generally designate the same elements, illustrate parts of an exemplary base 10 and/or different modules 20,20',20" in different connection and disconnection configuration of a beverage preparation machine 1 according to the invention. For the purpose of the following illustration of an embodiment of a beverage machine according to the invention, module 20 embodies a coffee preparation module of the type disclosed in WO2007/135136, module 20' embodies a tea preparation module of the type discussed in WO 2007/042415 and WO 2007/134960, and module 20" embodies a milk frothing module of the type disclosed in WO 01/26520. Many different or alternative modules and module types can of course be used within the framework of the current invention.

The illustrated beverage preparation machine 1 comprises a base 10 having a fluid circuit for conditioning and delivering a fluid via a base outlet 11 and a base data interface 12,13, in particular a fluid circuit connected to a fluid source and controlled by a control unit and comprising the membrane pump 100 and optionally a thermal conditioner such as a heater and/or a cooler. Machine 1 further comprises a removable module 20 having a module inlet 21 and a module data interface 22,23 detachably connectable to base outlet 11 and base data interface 12,13, respectively, in particular a module 20 having a unit for housing an ingredient to be mixed with the fluid.

Base 10 may have a frame 15 delimiting an inner cavity 15'. Frame 15 may form a structure for securing components of base 10, e.g. a pump, heater, control circuit. Frame 15 may be covered by outer panels or housing elements (not shown).

Cavity 15' may contain part or all of the fluid circuit (not shown), such as a pump, heater and/or cooler, tubes, valves, flowmeter, temperature sensor, pressure sensor, fluid connectors, etc. . . . and further components such as a control unit, power management system, etc. . . . Fluid circuits are disclosed in greater details in WO 2009/074550, the content of which is hereby incorporated by way of reference.

The fluid circuit may be associated to a fluid tank, in particular a water tank. Examples of suitable fluid tanks and connections to the fluid circuit are for example disclosed in WO 2010/046442 and WO 2011/089210.

Base 10, in particular a frame 15 thereof, may contain a cavity 15" to which used ingredients and/or waste materials may be evacuated during use. Cavity 15" may cooperate with a removable container 15''' that collects such used ingredients and/or waste materials and that may be emptied whenever necessary. Such systems are for example disclosed in WO 2009/074559, WO 2009/153298 and WO 2011/086087, the contents of which is hereby incorporated by way of reference.

Machine 1 can also be associated with a space for placing a receptacle 5,6 for collecting a beverage dispensed from module 20,20',20". The receptacle may be a user-receptacle such as a cup 5, a mug 6 or a pot, e.g. a tea pot (not shown). The placing space may be formed by a part of machine 1 or by a support surface by which machine 1 is supported. Receptacle placing surfaces are well known in the art, e.g. as disclosed in EP 1 867 260 or in WO 2009/074557. As illustrated in the Figures, a recipient support 16 may be connected to base 10, in particular to frame 15 of base 10.

Module 20 can have a mixing unit, e.g. an ingredient cavity for receiving and housing therein an ingredient supplied into module 20 via an ingredient passage. Module may be configured to circulate a liquid via fluid inlet 21 into the cavity, typically for mixing with the ingredient in particular for brewing the ingredient. The cavity may be configured for holding and housing a flavouring ingredient, such as tea or coffee or chocolate or powder milk.

For instance, mixing unit 25 of removable module 20 has a first part and a second part that delimit a cavity and that are relatively movable between a processing configuration for housing in the cavity the ingredient and a transfer configuration for inserting the ingredient into mixing unit 25 and for evacuation thereof from mixing unit 25. The cavity can be arranged to enclose a capsule containing such ingredient. In the transfer configuration, mixing unit 25 may have: an ingredient insertion channel along which the ingredient is driven by gravity into the cavity prior to mixing; and/or an ingredient evacuation channel along which the ingredient is driven by gravity from the cavity after mixing.

As mentioned above, the ingredient may be inserted pre-portioned within a capsule into this cavity. Such ingredient capsule may be of the type described above under the header "field of the invention".

Modules 20,20' may have a handle 29 for bringing mixing unit 25 from an ingredient mixing configuration to an ingredient insertion/evacuation configuration.

Suitable capsules for modules 20,20' are for example disclosed in EP 0 512 468, EP 0 512 470 and WO 2007/042414. A flavoured beverage may be prepared by circulating a carrier liquid, such as water, into the ingredient cavity to flavour the liquid by exposure to the flavouring ingredient held in the cavity.

The ingredient cavity may be delimited by first and second parts that are relatively movable between a processing configuration for housing therein the ingredient and a transfer configuration for inserting such ingredient into the processing module and/or for evacuation thereof from the processing module. An automatic ingredient recognition system may be used to parameterize and adjust the processing of the ingredient automatically in line with the type of ingredient.

When closed capsules of flavouring ingredients are used, first and second parts delimiting the ingredient cavity may include a capsule opener such as blades and/or a tearing tool, e.g. a plate with a tearing profile, for instance as known from Nespresso™ machines. See for example EP 0 512 468 and EP 0 512 470.

Embodiments of suitable mixing units, e.g. brewing units, and capsule management are for example disclosed in WO 2005/004683, WO2007/135136 and WO 2009/043630, which are hereby incorporated by way of reference.

Moreover, module 20 typically includes a downstream fluid arrangement leading into an outlet 26 for dispensing beverage to a user, e.g. to an area 16 for placing a user-cup 5 or a user-mug 6, the beverage formed in the module's ingredient cavity containing the ingredient mixed with the circulating fluid or liquid, e.g. water. The dispensing area 16 may be delimited at the bottom by a support surface for holding a user cup or mug 5,6. The support surface may be part of base 10 of machine 1. Such support surfaces are well known in the art, e.g. as disclosed in EP 1 867 260 and WO 2009/074557.

Base 10 of beverage machine 1 typically includes one or more of the following components:
  a) a fluid circuit, as discussed above and hereafter;
  b) a heater and/or cooler for conditioning the temperature of a fluid, e.g. water and/or steam, circulating along the fluid circuit to module 20 via outlet 11, in particular an in-line heater and/or cooler;
  c) a membrane pump for pumping the fluid through the heater and/or cooler;
  d) one or more fluid connecting members for guiding the fluid from a source of liquid, such as tank of fluid, e.g. liquid such as water;
  e) an electric control unit, in particular comprising a printed circuit board (PCB), for receiving instructions from a user via an input user-interface and/or data via data interfaces 12,13 and for controlling the heater and/or cooler and/or the pump; and/or
  f) one or more sensors for sensing at least one characteristic selected from characteristics of the heater, cooler, the pump, a liquid tank, an ingredient collector, a flow of the liquid (e.g. by a flowmeter), a pressure of the liquid and a temperature of the liquid, and for communicating such characteristic(s) to the control unit.

The heater may be a thermoblock or an on demand heater (ODH), for instance an ODH type disclosed in EP 1 253 844, EP 1 380 243 and EP 1 809 151. Control unit configurations and connections are for example disclosed in WO 2009/043851 and WO 2009/043865.

Base data interface 12,13 and module data interface 22,23 may be mechanically connectable and detachable along a direction (indicated by arrow 2) of the connection and disconnection of base outlet 11 and module inlet 21.

As mentioned above, by providing a common direction 2 of connection and disconnection of the respective data interfaces 12,13,22,23 and the fluid inlet 21 and outlet of module 20 and base 10, the combined connection 11 system 11,12, 13,21,22,23 can be physically secured, i.e. proper fluid connection and proper data connection, in one direction only. This improves the connection simplicity and reliability.

As illustrated in FIG. 3, base outlet 11 and module inlet 21, e.g. two tubular sections concentrically joinable end-to-end, have an inner flow configuration that defines a direction of flow (indicated by arrow 3) from base outlet 11 into module inlet 21, i.e. at the junction of outlet 11 and the inlet 21. This flow direction 3 can be generally parallel to the connection and disconnection direction 2.

As discussed above, the pressure increase at inlet 21 and outlet 11 caused by the circulation of fluid therein, e.g. liquid pumped at 5 to 25 bar, can be absorbed (to prevent disconnection by pressurised fluid circulation) by the same fastening system along the same direction of connection of inlet 21 and outlet 11 and the interfaces.

Base 10 can have a base connector block 14, as illustrated in FIGS. 1 to 5, for mechanical connection to module 20. Base outlet 11 and base data interface 12,13 are borne, in particular fixedly borne, by base connector block 14. As illustrated in FIGS. 2 and 3, a tubular section forming an outlet 11 extends through connector block 14. Likewise, connection pins 12 extend through block 14. Sensors 13, e.g. Hall sensors, are mounted in block 14 and connected on the other side of block 14 to an electric interface connector 13'.

As illustrated in the exemplary embodiment of base 10, a frame 15 is provided to which base connector block 14 is movably mounted. Frame 15 can be stationary and may typically be covered or partly covered by housing sections or panels (not shown). Connector block 14 can be pivotally mounted in or to frame 15. Base connector block 14 may be movable relative to frame 15 between an unlocked position (FIGS. 3 and 4) for connecting and/or disconnecting module 20 to machine's base 10 and a locked position (FIG. 5) for locking module 20 upon connection to base 10.

Module 20 can have a module connector block 24 for mechanical connection to base 10, in particular to base connector block 14. Module inlet 21 and module data interface 22,23 are borne, in particular fixedly borne, by module connector block 14. As discussed above, module 20 has optionally an ingredient mixing unit 25 that is fixed to module connector block 24 and that is in fluid communication with the module inlet 21. As illustrated connector block 24 is fixed via legs 24' to mixing unit 25 that may be of the type disclosed in WO 2007/135136. Inlet 21 may be an end of a tubular section extending through connector 24 to opening 21' that may be connected by a tube (not shown) to mixing unit 25.

Figure 5:
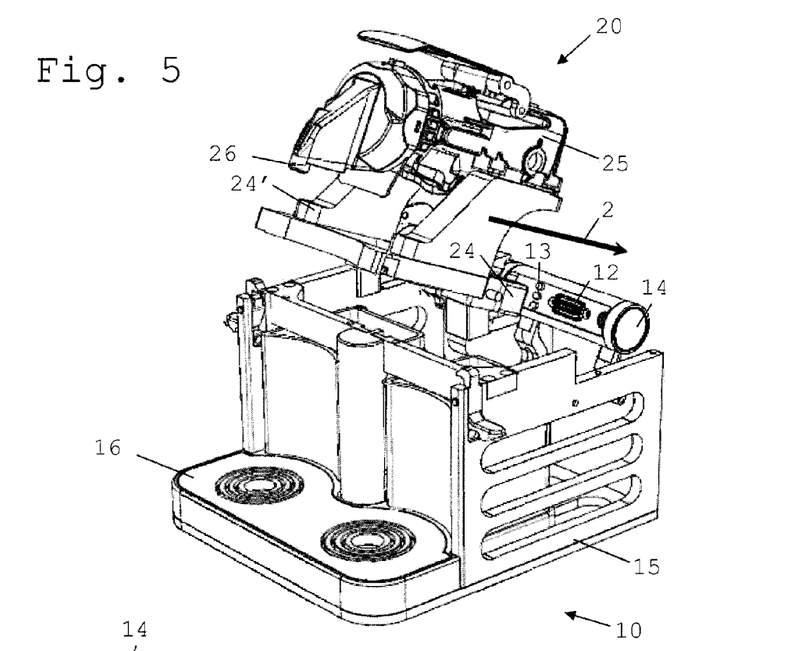
FIG. 5 shows a perspective front and side view of a disconnected module and base of a beverage preparation machine according to invention.
Figure 6:
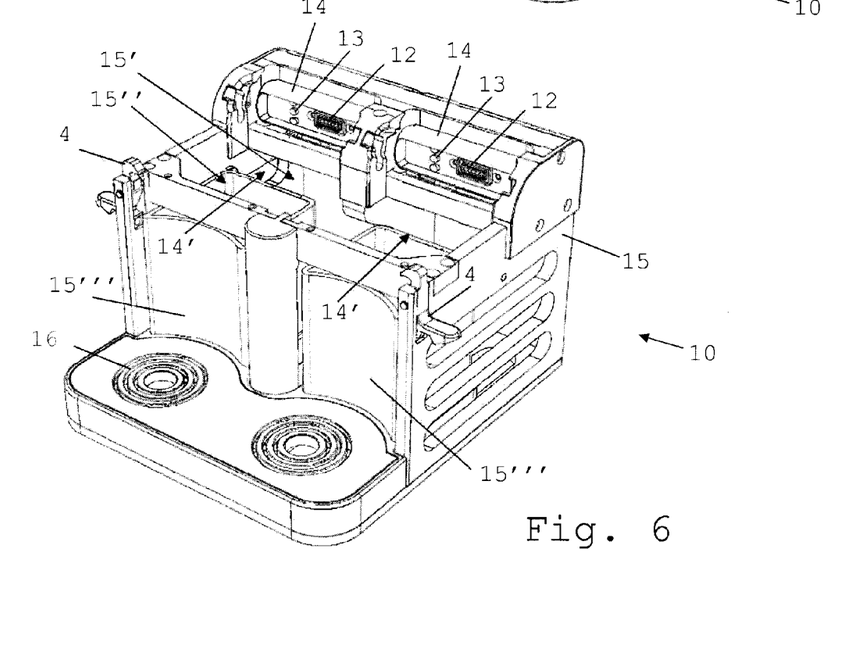
FIG. 6 illustrates the base shown in FIG. 5.
Figure 7:
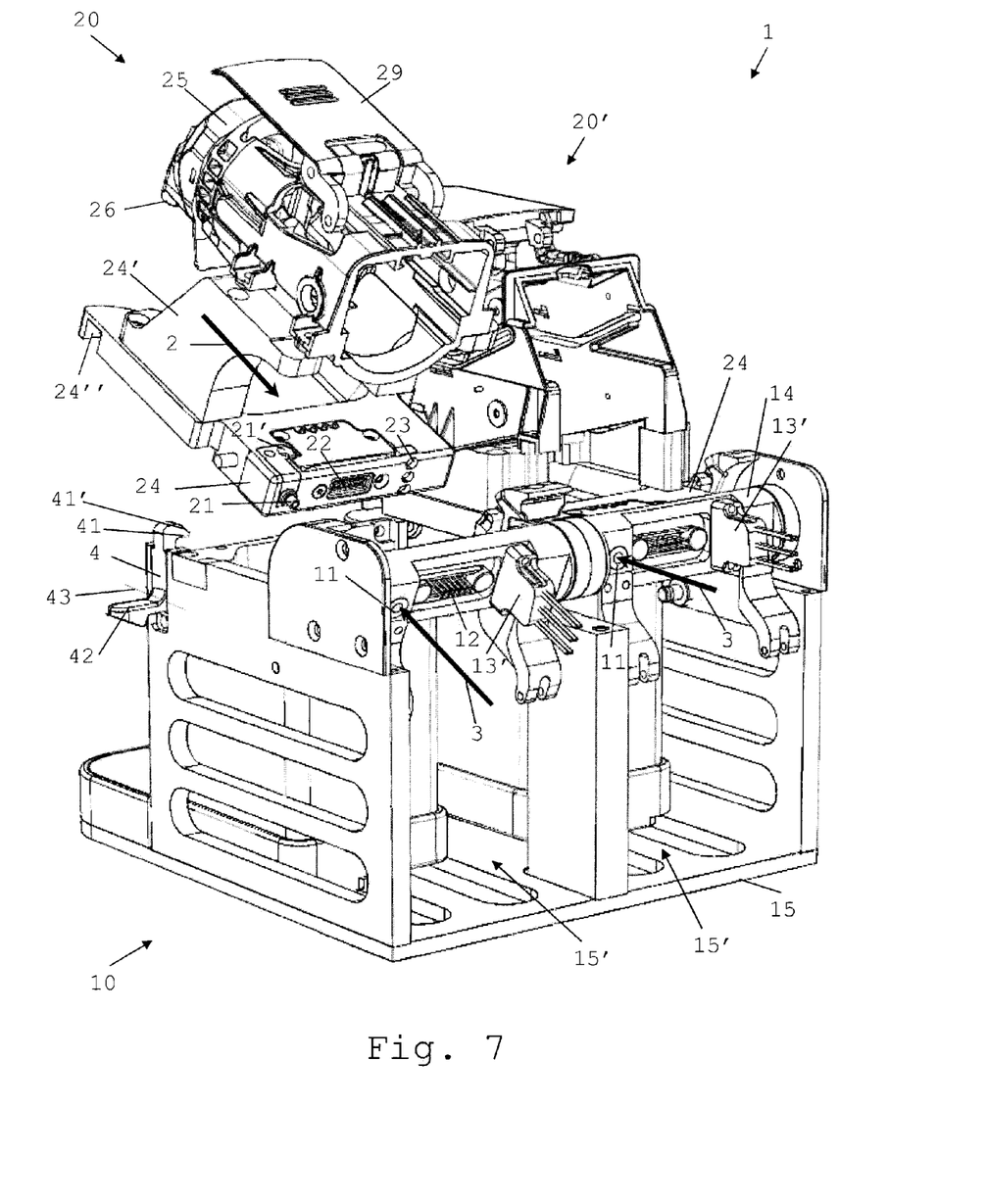
FIG. 7 shows a perspective rear and side view of beverage preparation machine according to invention having a base with a disconnected first module and a connected second module.
Figure 8:
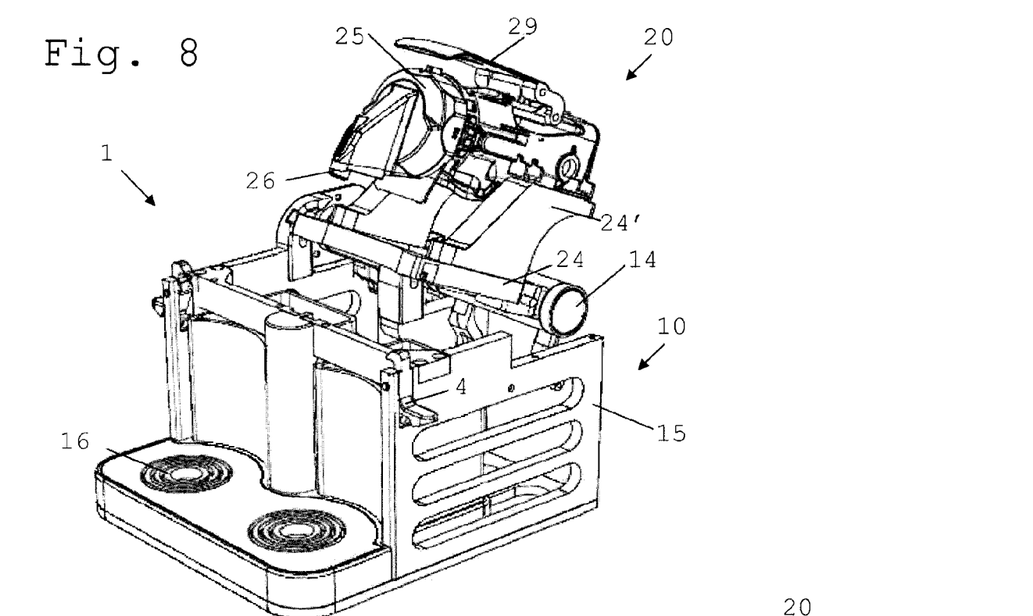
FIG. 8 illustrates the base and module shown in FIG. 5 in a connected state.
Figure 9:
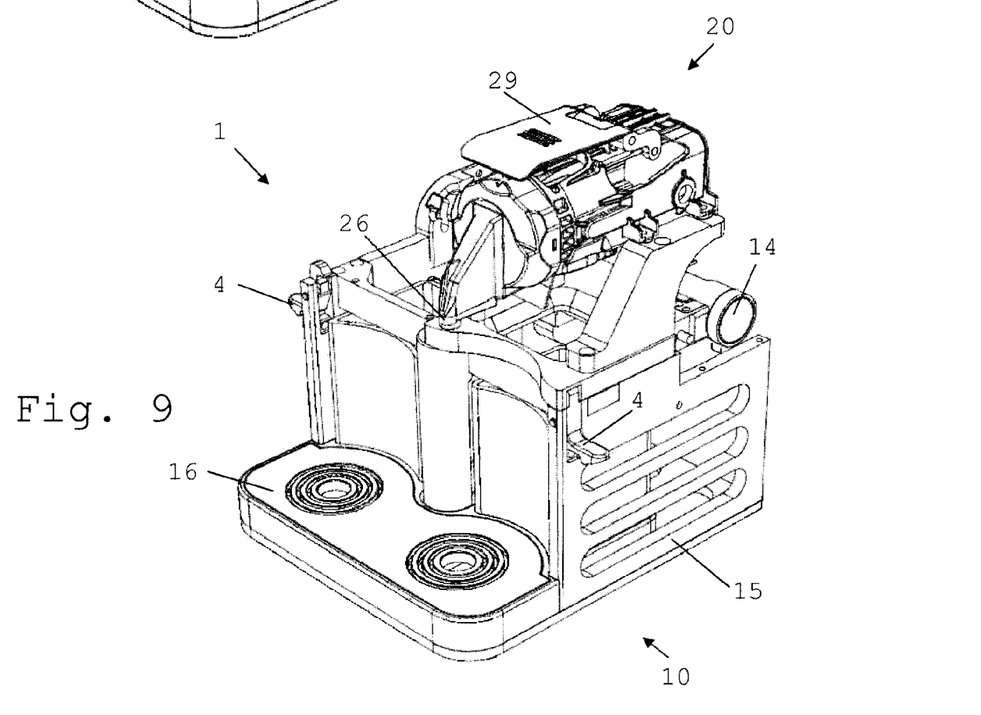
FIG. 9 shows the same base and module connected and locked.

Beverage preparation machine 1 comprises a fastener or lock 4 for securing together base 10 and module 20 upon connection of base outlet 11 to module inlet 21 and base data interface 12,13 to module data interface 22,23, as illustrated in FIGS. 5 to 7. As shown in FIG. 3, fastener or lock may include at least one latch 4, e.g. a swing latch pivotally mounted to frame 15 about pivot axis 43 indicated in doted lines. Latch 4 has a retainer end or hook 41 and a manual (or automatically driven) actuation end 42. Latch 4 may be elastically constrained into the locking position, e.g. by a spring (not shown). When connector block 24 is moved into the locking position (from FIG. 4 into FIG. 6), connector block 24, e.g. shaped as a foot of module 20) pivots latch 4 aside (clockwise in FIG. 7) by pressing on a bevelled and/or inclined top 41' of hook or retainer 41, which stresses the latch spring. Latch 4 then returns (counter-clockwise in FIG. 7) to enter with hook or retainer 41 into latch receiver 24" and so fasten module 20 in connection to base 10. To unfasten module 20, the user (or an automatic system) may simply press down actuation end 42 whereby latch 4 is pivoted out of latch receiver 24" to allow upward rotation of connector block 24 and then disconnection thereof from base 10. To facilitate or assist motion of module 20 or connector 14 into the connection and/or disconnection orientation (FIG. 4), a spring (not shown) may be used to bias module 20 into this orientation. For example, such a spring is fixed to connector 14 and frame 15.

Typically, module 20 comprises a mixing unit 25 downstream module inlet 21 for holding an ingredient that is mixed downstream inlet 21 with fluid fed into unit 25 via base outlet 11 and module inlet 21 to form a mixture (typically a beverage) that is dispensed via a machine outlet 26. Mixing unit 25 may be a unit for merely combining ingredients, e.g. milk or water with instant tea, chocolate, coffee or soup. Mixing unit 25 may be a brewing unit, e.g. for extracting flavouring components from an ingredient such as ground coffee or tea leaves.

The fluid fed into unit 25 (via inlet 21) and mixed with an ingredient located in unit 25 is preferably prevented from contacting the base outlet 11. The fluid mixed with the ingredient is preferably prevented from contaminating those parts of base 10 that come into contact with module 20, e.g. outlet 11 and connector 14 as well as interface 12,13, so as to avoid any contaminating transfer of fluid mixed with the ingredient from one module 20 to another module 20,20',20" via base 10 when modules 20,20',20" are exchanged on base 10. For instance, module inlet 21 is in fluid communication with mixing unit 25 via an anti-return valve and/or via a fluid conduit that has a ratio of length and cross-section that is sufficiently high to prevent a return-flow of such mixture (fluid and ingredient) from mixing unit 25 to outlet 11.

Typically, base 10 incorporates a control unit, e.g. processor or controller with various components such as memory chip, clock, sensors, etc. . . . for controlling the fluid circuit of base 10 and constitutive parts thereof. Such control unit is typically connected to interface 12,13 and optionally to a user-interface on base 10 or module 20 for local user-control and/or a network interface for distant control.

Module data interface 22,23 can be arranged to communicate data to the base 10 via base data interface 12,13 for parametrizing the conditioning and delivery of fluid from the base outlet 11 into the module inlet 21. Parameters of different types may be adjusted in line with such communicated data, such as parameters relating to the temperature, pressure, flow rate or even the composition of the fluid conditioned and delivered by base 10 via outlet 11.

Module data interface 22,23 can be arranged to communicate module identification data to base 10 via base data interface 12,13 for identification by base 10 of a type of module 20 connected to base 10 from a plurality of different types of modules 20,20',20", such as different types of modules for processing coffee, tea, milk, chocolate and soup. Such different modules 20,20',20" may be of the type known in the art, e.g. as indicated in the general description above.

Module data interface 22,23 can be arranged to communicate ingredient identification data to the base 10 via base data interface 12,13 for identification by base 10 of a type of ingredient contained in module 20 connected to the base from a plurality of different types of ingredients suitable to be processed by the module. For instance, the system may be used to identify a particular tea blend or a particular coffee blend of a plurality of available blends or a particular amount of ingredient selected from a plurality of available amounts typically when an ingredient is supplied to module 20 in a preportioned form e.g. within capsules.

As mentioned above, machine 1 may comprise a user-interface (not shown) assembled to module 20 and/or to base 10. Base and module data interfaces 12,13,22,23 may be used to communicate user-data from a user-interface on module 20 to base 10 and/or to parameterize a user-interface on base 10 in line with a particular module and/or ingredient used in the module connected to base 10. For instance, if base 10 accepts a first module 20 for preparing coffee from ground coffee, a second module 20' for preparing tea from tea leaves and a third module 20" for preparing hot and/or frothed milk, a single user-interface unit, e.g. with a screen or a touch screen, may be automatically adapted to the particular characteristics of the different beverages that can be prepared with the different modules 20,20',20", such as the quantity of the beverage and/or the quality of the beverage (froth, crema, temperature . . . ) appropriate for the type of relevant beverage (milk, coffee, tea . . . ).

The module and base data interfaces may comprise cooperating module and base connectors 12,22 for transmitting data in electric or optical form, in particular for transmitting ingredient identification data. Examples of systems for identifying a type of ingredient in a module are disclosed in WO02/28241.

The module and the base data interfaces can comprise cooperating module and base connectors 13,23 for transmitting data in magnetic and/or mechanical form, in particular for transmitting module identification data. Connector 23 may be a magnet arrangement comprising a plurality of magnets, e.g. 0 to 3 magnets as depicted, each module type 20,20', 20" having a different arrangement. Connector 13 may include a corresponding sensor arrangement, e.g. a hall sensor arrangement, for detecting the presence and disposition of magnets 23 on module 20.

Connector 13' is arranged to connect sensors 13, e.g. to power and/or transmit signals, to a control unit of base 10.

A beverage preparation machine 1 may comprise more than one seat 14' for receiving a module 20,20',20". A base 10 with two such seats 14' side-by-side is illustrated in the Figures. Hence, simultaneously, two modules 20,20',20" can be removably mounted onto the same base 10.

The same kind of module may be mounted simultaneously to base 10 so to that more than one beverage of the same type may be prepared and served at a time with a single machine 1.

Figure 10:
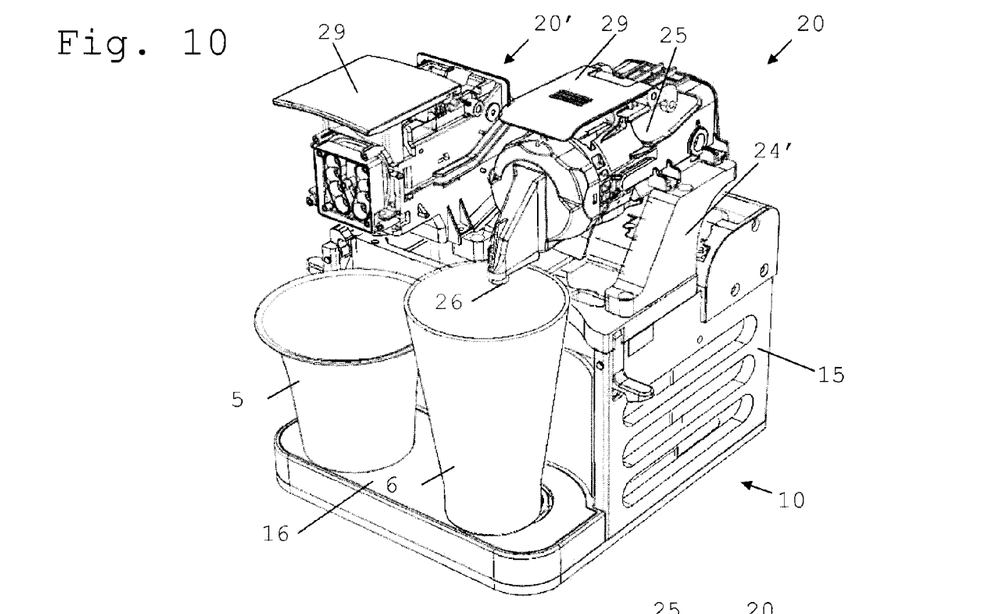
FIG. 10 illustrates the base with first and second modules of FIG. 7 in a connected and locked state.
Figure 11:
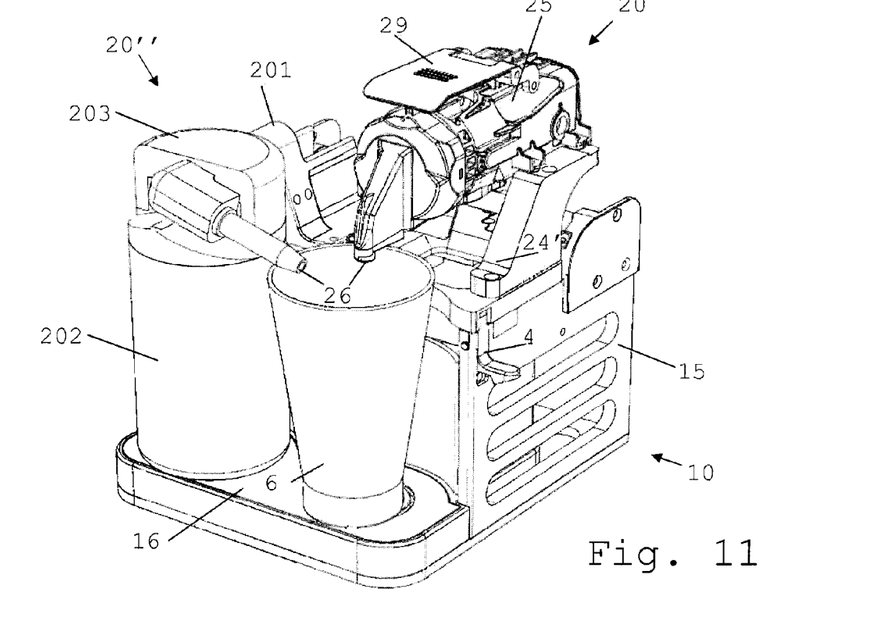
FIG. 11 illustrates the base and the first modules of FIG. 7 cooperating with a third module.

Different kinds of modules may be mounted simultaneously, e.g. as illustrated in FIGS. 10 and 11, to be able to prepare different beverages or combination beverages with the same base 10. A module 20,20' may project over a recipient support surface 16, in particular an outlet of module 20,20' may be located above the space for placing a recipient 5,6 as illustrated in FIG. 10.

Module 20" shown in FIG. 11 may be arranged for producing conditioned milk, e.g. heated or cooled milk, and/or frothed or non-frothed milk. Module 20" may have an upstream part 201 for the intake of heated or cooled fluid such as water, in particular steam, from base 10 via base outlet 11 and a module inlet. Such a module upstream part 201 may be connected and locked to base 10 following the same principle as discussed above in relation with the connection and locking of module 20. Furthermore, module 20" may have a tank 202 for storing milk, a milk conditioning part 203 for exposing directly or indirectly milk from tank 202 to the fluid from base 10, e.g. in a venturi system contained in conditioning part 203. Module 20" usually includes an outlet 26 for dispensing the conditioned milk, e.g. to a user recipient 6. Suitable milk conditioning systems are for example disclosed in WO 01/26520, the content of which is hereby incorporated by way of reference.

Module 20" may have upstream part 201 that is detachably connectable to milk tank 202 and conditioning part 203. Upstream part 201 includes a fluid outlet 201' for circulating fluid to tank 202 and/or part 203 via a corresponding inlet 203'. Tank 202 and part 203 may also be mechanically secured to part 201 via the connection formed by outlet 201' and inlet 203' upon assembly thereof.

Furthermore, upstream part 201 may include a push-button 201" or other interface for setting the characteristics of the desired fluid, e.g. water, delivered from part 201, usually via outlet 201'. Such characteristics may include the temperature (ambient, cooled or heated), physical state (liquid or vapour), pressure of the delivered fluid. The push-button or other interface 201" may be controlled by a corresponding push element or corresponding interface of a device, e.g. tank and part 202,203, connected to the upstream part. The corresponding interface (or push element) of this device may be fixed or may be changed so that the fluid delivered to the same device may be adjusted, e.g. by the user, as desired when the device is versatile. Hence, the device may include a user-interface for inputting the desired characteristics.

The information as to the desired characteristics can then be transmitted to base 10 via data interfaces 12,13, 22,23, as discussed above.

Space 16 for placing a recipient may be used to position a larger module 20", for example a module for storing and conditioning milk as just described.

When base 10 has more than one seat 14' for connecting modules 20,20',20", two modules 20,20" may have their respective outlets 26 leading into the same user-recipient 6, as illustrated in FIG. 11. Hence, a combined beverage may be produced and dispensed into the same recipient using two different modules 20,20". For example, a cappuccino (coffee from module 20 with frothed heated milk from module 20") may be prepared in a mug 6 without moving the mug during the preparation process.

It is also possible to use two (or more) modules of the same type to prepare and dispense in parallel a similar beverage into a single recipient, e.g. to prepare a double espresso by producing simultaneously from two modules single espressos, and have the respective module outlets lead into the same recipient. Hence, the same time is needed to prepare a single or a double (or multiple) beverage.

Optionally, such a seat 14' may receive a module that is not connected to the base outlet 11 such as a user-interface module that is connected to the base via the base and module data interfaces. Hence, a base 10 with two seats 14' may be connected to a module 20,20',20" of the above type and to another module, e.g. a module that is not used to mix ingredients such as a user-interface module or a network-interface module. When a module is not used for mixing ingredients, the corresponding base outlet 11 will normally not be used for delivering fluid to such a module.

When base 10 is configured to be connected to more than one module 20,20',20" simultaneously, e.g. by having a plurality of seats 14' for mounting such modules, base 10 may have separate fluid circuits, each dedicated to a corresponding module, or base 10 may have fully or partly shared fluid circuits, e.g. a sharing between several modules 20,20',20" of components of the fluid circuit, e.g. a pump and/or a thermal conditioner such as a heater and/or cooler. Examples of shared fluid circuits between different outlets are disclosed in EP 1 764 014, the content of which is hereby incorporated by way of reference.

The invention claimed is:

1. A beverage preparation machine, comprising:
   a base having a fluid circuit for conditioning and delivering a fluid via a base outlet, the fluid circuit being coupled to a fluid source and controlled by a control unit and comprising a pump, wherein the base has a base data interface, and wherein the pump is a membrane pump;

at least one module having a module inlet cooperating with the base outlet, the at least one module having an ingredient cavity for receiving and housing a capsule containing an ingredient to be mixed with the fluid and/or for receiving and housing a loose ingredient to be mixed with the fluid, and wherein the module is a removable module having a module data interface detachably connectable to the base data interface and wherein the module inlet is detachably connectable to the base outlet; and wherein the base is compatible for connection to and operation of different types of modules for the preparation of different types of beverages, and wherein the control unit is configured to control the flow and the pressure of the liquid delivered by the membrane pump to the module during the preparation of a beverage according to a command selected from a plurality of commands suitable for different types of ingredients and/or for different preparation processes of a given ingredient.

2. The beverage preparation machine of claim 1, wherein the membrane pump is adapted to deliver up to 600 ml/min of the fluid to the module.

3. The beverage preparation machine of claim 1, wherein the membrane pump is adapted to deliver the fluid to the module with a pressure up to 25 bars.

4. The beverage preparation machine of claim 1, wherein the control unit is configured to control, according to at least one of the plurality of commands, the membrane pump to deliver between 100 and 300 ml/min of the liquid to the module with a pressure comprised between 12 and 25 bars, during at least one period of the preparation of the beverage.

5. The beverage preparation machine of claim 1, wherein the control unit is configured to control, according to at least one of the plurality of commands, the membrane pump to deliver between 300 and 600 ml/min of the liquid to the module with a pressure comprised between 0 and 3 bars, during at least one period the preparation of the beverage.

6. The beverage preparation machine of claim 1, wherein the control unit is configured to selectively use one of the plurality of commands based on a user input.

7. The beverage preparation machine of claim 1, wherein the control unit is configured to selectively use one of the plurality of commands based on the type of the ingredient housed by the module.

8. The beverage preparation machine of claim 1, wherein the removable module is arranged to communicate module identification data to the control unit via the base data interface for identification by the base of a type of module connected to the base from a plurality of different types of modules, wherein one of the plurality of commands is used selectively by the control unit according to the identification data of the removable module used to prepare the beverage.

9. The beverage preparation machine of claim 8, wherein the plurality of different types of modules include at least one module for processing at least one of coffee, tea, milk, chocolate, and soup.

10. The beverage preparation machine of claim 1, wherein the removable module is arranged to communicate ingredient identification data to the base via the base data interface for identification by the base of a type of ingredient contained in the module connected to the base from a plurality of different types of ingredients suitable to be processed by the removable module, wherein one of the plurality of commands is used selectively by the control unit according to the ingredient identification data of the removable module used to prepare the beverage.

11. The beverage preparation machine of claim 1, further comprising a plurality of seats for connecting simultaneously a corresponding plurality of modules.

12. The beverage preparation machine of claim 11, wherein the plurality of seats are connected to a corresponding plurality of modules by a corresponding plurality of base outlets, module inlets, base interfaces, and module interfaces.

13. The beverage preparation machine of claim 11, wherein one of the plurality of seats is a seat that is connected to a module that is not connected to the base outlet.

14. The beverage preparation machine of claim 13, wherein the seat is connected to a user-interface module that is connected to the base via the base and module data interfaces.

15. A beverage preparation machine for simultaneous preparation of at least two beverages, the beverage preparation machine comprising:

a base having at least one fluid circuit for conditioning and delivering a fluid via at least one base outlet, the at least one fluid circuit being coupled to at least one fluid source and controlled by at least one control unit and comprising at least one pump, wherein the base has at least one base data interface, and wherein the at least one pump is a membrane pump;

at least a first module having a module inlet cooperating with the at least one base outlet, the at least one module having an ingredient cavity for receiving and housing a capsule containing an ingredient to be mixed with the fluid and/or for receiving and housing a loose ingredient to be mixed with the fluid, and wherein the first module is a removable module having a module data interface detachably connectable to the base data interface and the module inlet being detachably connectable to the base outlet;

at least a second module having a module inlet cooperating with the at least one base outlet, the at least one module having an ingredient cavity for receiving and housing a capsule containing an ingredient to be mixed with the fluid and/or for receiving and housing a loose ingredient to be mixed with the fluid, and wherein the second module is a removable module having a module data interface detachably connectable to the base data interface and the module inlet being detachably connectable to the base outlet; and wherein the base is compatible for connection to and operation of the at least two modules for the preparation of at least two beverages, and wherein the control unit(s) is configured to control the flow and the pressure of the liquid delivered by the membrane pump(s) to each of the modules during the preparation of the beverages according to a command selected from a plurality of commands suitable for different types of ingredients and/or for different preparation processes of a given ingredient.

16. The beverage preparation machine of claim 15, wherein the first and second modules are each for processing at least one of coffee, tea, milk, chocolate, and soup.

17. The beverage preparation machine of claim 16, wherein the second module is for processing a different ingredient than the first module.

* * * * *